Feb. 2, 1954     O. J. SUNDSTRAND ET AL     2,667,956
BUSINESS MACHINE WITH OPTIONALLY MOVABLE HEAD OR PLATEN
Filed Dec. 20, 1951     2 Sheets-Sheet 1
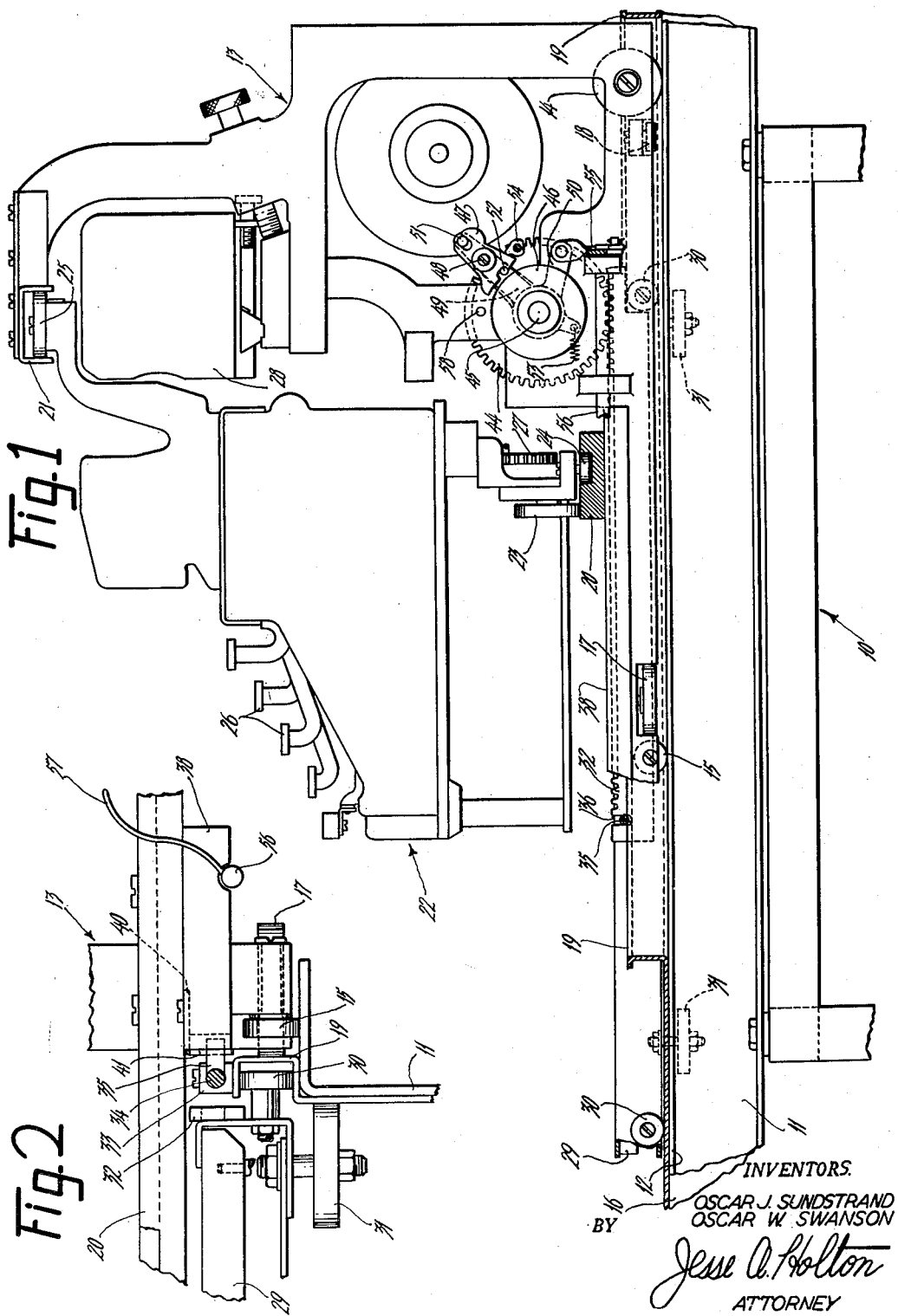
INVENTORS.
OSCAR J. SUNDSTRAND
OSCAR W. SWANSON
BY Jesse A. Holton
ATTORNEY

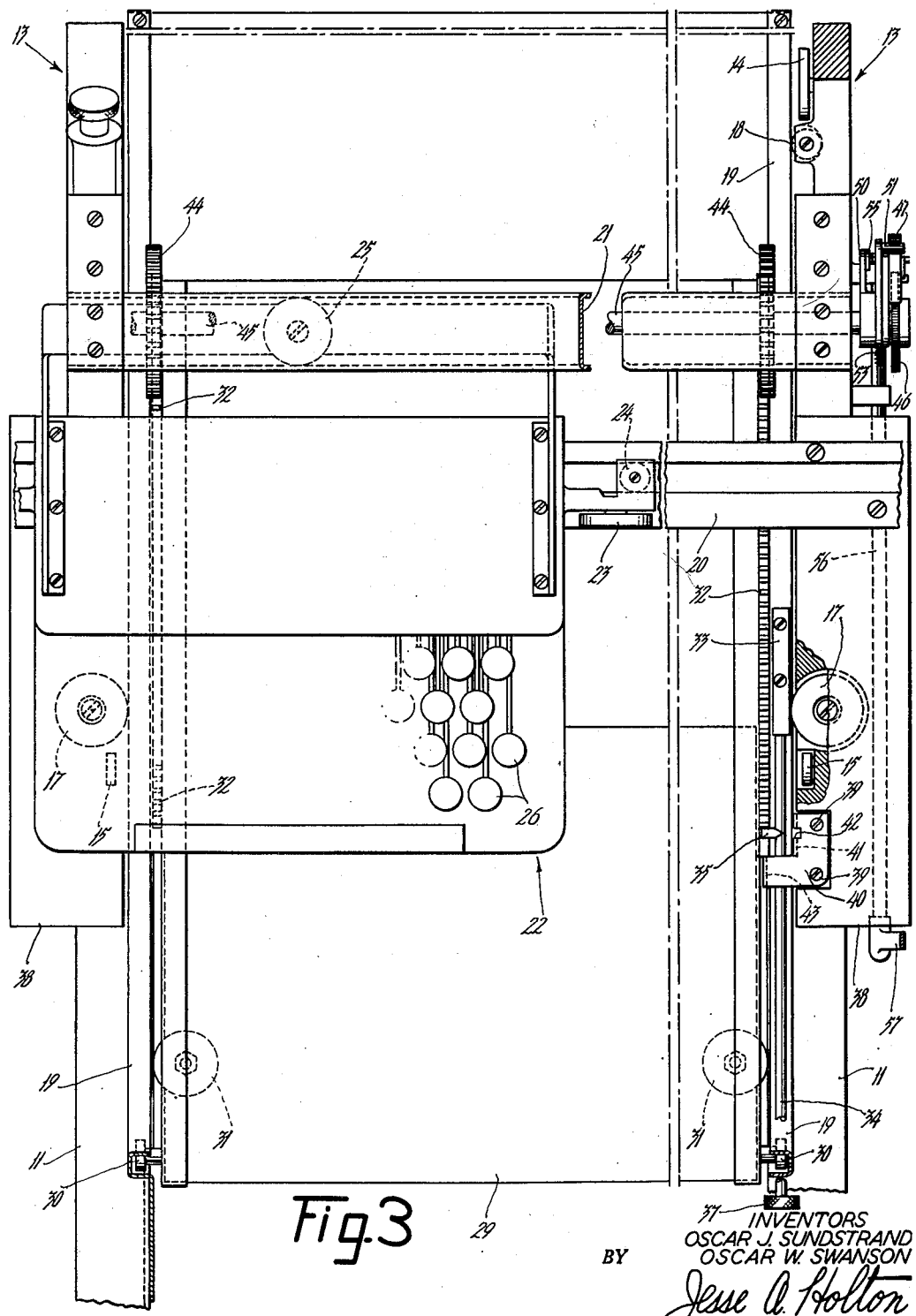

Patented Feb. 2, 1954

2,667,956

UNITED STATES PATENT OFFICE 2,667,956

BUSINESS MACHINE WITH OPTIONALLY MOVABLE HEAD OR PLATEN

Oscar J. Sundstrand and Oscar W. Swanson, West Hartford, Conn., assignors to Underwood Corporation, New York, N. Y., a corporation of Delaware Application December 20, 1951, Serial No. 262,614

6 Claims. (Cl. 197—2)

1

The present invention relates to the well known "Elliott Fisher" flat platen business machine and is equally applicable to a typewriting machine and an accounting machine. "Elliott Fisher" machines generally are provided with a head or type carriage mounted for letter-space and line-space movement over a subjacent flat platen. Such machines are also known wherein the platen is moved for line spacing, the head movement being confined to letter spacing.

It is an object of the present invention to provide a flat platen machine having provision whereby the operator may optionally cause either the type carriage or the platen to partake of line-space and return movements.

This and other objects, features and advantages will become apparent as the description of a preferred embodiment of the invention proceeds.

Referring now to the drawings:

Figure 1 is a side elevational view, partly in section, of a business machine embodying the principles of the present invention, Figure 2 is an end elevational view of a portion of the machine, and Figure 3 is a plan view of the machine.

The particular machine chosen to illustrate the present invention is an accounting machine constructed generally along the lines of the machine shown in the patent to Foothorap, No. 1,904,127, but it will be apparent as the description proceeds that the features of the present invention are equally applicable to typewriting machines, as well as to accounting machines having different specific mechanisms from those of the Foothorap patent.

The machine includes a stationary frame generally indicated in Figure 1 at 10, upon which are secured a pair of longitudinally extending channel members 11, the upper horizontal arms 12 of which serve as a trackway or rails for supporting a type carriage. A line-space frame or type-carriage support generally designated 13, is provided with a pair of rear wheels or rollers 14 and a pair of front wheels or rollers 15 for supporting same for fore-and-aft movement along the rails 12.

A second pair of rails or track-forming members 16 are carried by the stationary frame 10 as by being welded or otherwise secured to the channel members 11. The type-carriage support 13 is provided with a pair of large wheels or rollers 17 and with a pair of small wheels or rollers 18 for bearing against the side of a channel-shaped portion 19 of the track-forming mem-

2 bers 16, to thereby guide the type-carriage support during its fore-and-aft movement along the rails 12.

The type-carriage support is provided with a transversely extending trackway 20 and with an upper transversely extending channel member 21. A type carriage generally designated at 22 is provided with a pair of spaced-apart wheels 23, only one of which is shown, and rollers 24 for mounting it upon the trackway 20 and with a roller 25 for cooperating with the channel member 21. The type carriage is provided with the usual array of alphabet and numeral types, not shown, operated from the keyboard by the usual keys 26 and is controlled during its letter-feed movements by the usual escapement mechanism, partially shown in Figure 1 at 27. A plurality of totalizers or column registers 28, only one of which is shown, are mounted upon the type-carriage support 13 for cooperation with the usual computing mechanism as the type carriage moves from computing column to computing column.

A flat platen 29 is mounted in a frame, as described in the above mentioned Foothorap patent, and said frame is provided with a pair of front and rear rollers 30 mounted within the channel-shaped portion 19 of the track-forming members 16 for supporting said platen for fore-and-aft movement, and with a pair of rollers 31 bearing against the sides of the members 16 for guiding said platen during its fore-and-aft movement.

Secured to the platen, or more specifically, to the platen frame, and extending along the sides thereof, are a pair of racks 32, the purpose of which will presently be explained. Fixed to the top of the channel-shaped portion of the right-hand member 16, by means of screws or otherwise, is a block 33 within which is rotatably mounted one end of a locking element in the form of a rod 34 having a protrusion 35. The right-hand rack 31 is provided with a locking element in the form of a notch 36 and, by means of a knurled knob 37, the rod 34 may be rotated to position the protrusion 35 with said notch to thereby lock the platen to the stationary frame.

A forwardly extending arm 38 of the type-carriage support 13 has secured thereto, by means of screws 39 or otherwise, a member 40 provided with a downwardly extending flange 41 within which is cut a notch 42 and with a downwardly extending flange 43.

With the platen 29 in its full forward position and locked to the stationary frame 10, as shown in Figures 1 and 3, the type-carriage support 13, and consequently the type carriage 22, may be moved forwardly along the rails 12 to space the printing point line-by-line down a worksheet carried by said platen. The flange 43, in cooperation with the front end of the right-hand rack 32, constitutes means for facilitating alignment of the notch 42 with the protrusion 35. Thus, when the type-carriage support 13 is returned rearwardly to a point where the flange 43 contacts the end of the rack 32, the notch 42 is aligned with protrusion 35 and the operator may then rotate the rod 34 from the position shown in Figures 1 and 3 to the position shown in Figure 2, thereby freeing the platen 29 for line-space movement and locking the type-carriage support 13 to the stationary frame. When it next becomes desirable to free the type-carriage support and lock the platen, the alignment of the notch 36 with the protrusion 35 is facilitated by the abutment of the end of the rack 32 against the flange 43, as will readily be understood.

Suitable line-space mechanism is provided for line spacing the unlocked one of the platen or the type-carriage support. The particular line-space mechanism employed is not of the essence of the present invention, but it may be conveniently constructed as described in the patent to Wise, No. 2,248,152. In general, the line-space mechanism comprises a pair of toothed wheels 44 meshed with the racks 32. The wheels 44 are fixed to a cross-shaft 45 rotatably mounted in the type-carriage support 13. When the shaft 45 is turned to rotate the toothed wheels 44, a relative fore or aft movement takes place between said toothed wheels and the racks 32. If the platen is locked, as above described, rotation of the wheels 44 in line-space direction results in a forward movement of the type-carriage support. If the type-carriage support is locked at the time of rotation of the wheels 44, such rotation results in a rearward movement of the platen.

The mechanism for turning the shaft 45 comprises a wheel 46 attached to one end of said shaft and having a series of fine teeth on its periphery which are engaged at intervals by a pawl 47 pivoted at 48 on a pawl carrier 49 mounted to turn on said shaft. A pawl-actuating bell crank 50 is also pivoted on said shaft and is provided with a pin or stud 51 on one arm thereof engaging in a slot provided in the outer end of the pawl 47. The pivotal movement of the pawl 47 with relation to the pawl carrier 49 is limited by means of a pin 52 projecting from the pawl carrier and engaging in a recess in the lower portion of the pawl. The pawl carrier and the pawl actuator are acted upon by springs, one of which is indicated at 53, to normally hold the parts in the position shown in Figure 1 with the pawl 47 in abutment with a stop 54. One arm of the bell crank 50 is connected by suitable linkage 55 to a forwardly extending shaft 56 which may be manually operated by means of a finger piece 57 to rotate the bell crank in a counterclockwise direction about the shaft 45. Counterclockwise rotation of the bell crank 50 causes the pawl 47 to engage the teeth of the wheel 46 and move said wheel and consequently the shaft 45 in a counterclockwise direction until a nose of the pawl 47 strikes against a stop 58 provided upon the type-carriage support 13. The rotation of the shaft 45, due to each operation of the finger piece 57, is sufficient to move the unlocked one of the platen or the type-carriage support a distance of one line space. If desired automatically operable means such as described in the above referred to patent to Wise, may be employed for operating the line-space mechanism.

Having thus described a preferred embodiment of the invention, what is claimed is:

1. A business machine comprising a stationary frame, a flat platen mounted for line-space movement on said frame, a type carriage support mounted for line-space movement on said frame, line-space mechanism comprising a rack fixed to said platen and a gear on said type carriage support, said gear meshing with said rack, means for imparting rotary movement to said gear, and selectively operable means for locking either the platen or the type carriage support to said stationary frame whereby rotation of said gear will cause the unlocked one of said platen or type carriage support to move.

2. A business machine comprising a stationary frame, two pairs of rails fixed to said frame, a flat platen mounted for movement along one pair of said rails, a rack fixed to said platen, a type-carriage support mounted for movement along the other pair of rails, a type carriage mounted on said support for letter-feed and return movement, line-space mechanism mounted on said support and including a toothed wheel meshed with said rack, and selectively operable means for locking either the platen or the type-carriage support to said stationary frame whereby operation of the line-space mechanism to cause relative movement between said toothed wheel and said rack will thereby line space either the platen or the type-carriage support, depending upon which one of them is unlocked.

3. A business machine comprising a stationary frame, two pairs of rails fixed to said frame, a flat platen mounted for movement along one pair of said rails, a rack fixed to said platen, a type-carriage support mounted for movement along the other pair of rails, a type carriage mounted on said support for letter-feed and return movement, line-space mechanism mounted on said support and including a toothed wheel meshed with said rack, a notch in said rack, a notch in said type-carriage support, a locking element mounted on said stationary frame and movable selectively between two extreme positions to engage one or the other of said notches to thereby lock either the platen or the type-carriage support to said stationary frame, and means to align the notch in the unlocked one of the rack or type-carriage support with said locking element whereby said locking element may be moved to its other extreme position to release the formerly locked one of the platen or type-carriage support and lock the other one to said stationary frame.

4. A business machine comprising a stationary frame, a type carriage mounted for line-space movement on said frame, a flat platen mounted for line-space movement on said frame, a first locking element on said frame, a second locking element associated with said platen, a third locking element associated with said type carriage, means for facilitating operative alignment of the second and third locking elements with the first locking element, and manually operable means for moving the first locking element into engagement with the second locking element to lock the platen to the stationary frame and for moving the first locking element into engagement with the third locking element to lock the type carriage to the stationary frame.

5. A business machine comprising a stationary frame, two pairs of rails fixed to said frame, a flat platen mounted for movement along one pair of said rails, a type-carriage support mounted for movement along the other pair of rails, a type carriage mounted on said support for letter-feed and return movement, a first locking element on said stationary frame, a second locking element on said platen, a third locking element on said type-carriage support, cooperating means on said platen and said type-carriage support for facilitating operative alignment of the second and third locking elements with the first locking element, and manually operable means for moving the first locking element into engagement with the second locking element to lock the platen to the stationary frame and for moving the first locking element into engagement with the third locking element to lock the type-carriage support to the stationary frame.

6. A business machine comprising a stationary frame, two pairs of rails fixed to said frame, a flat platen mounted for movement along one pair of said rails, a rack fixed to said platen, a type-carriage support mounted for movement along the other pair of rails, a type carriage mounted on said support for letter-feed and return movement, line-space mechanism mounted on said support and including a toothed wheel meshed with said rack, a first locking element on said stationary frame, a second locking element on said rack, a third locking element on said type-carriage support, cooperating means on said rack and said type-carriage support for facilitating operative alignment of the second and third locking elements with the first locking element, and manually operable means for moving the first locking element into engagement with the second locking element to lock the platen to the stationary frame and for moving the first locking element into engagement with the third locking element to lock the type-carriage support to the stationary frame, whereby operation of the line-space mechanism to cause relative movement between said toothed wheel and said rack will line space either the platen or the type-carriage support, depending upon which one of them is unlocked.

OSCAR J. SUNDSTRAND.
OSCAR W. SWANSON.

References Cited in the file of this patent
UNITED STATES PATENTS

| Number | Name | Date |
|---|---|---|
| 759,816 | Marriott | May 10, 1904 |
| 1,904,127 | Foothorap | Apr. 18, 1933 |